Feb. 12, 1952  R. HOFSTADTER  2,585,551
MEANS FOR DETECTING IONIZING RADIATIONS
Filed May 1, 1948  2 SHEETS—SHEET 1

INVENTOR.
ROBERT HOFSTADTER
BY Henry L. Shenier
ATTORNEY

Feb. 12, 1952   R. HOFSTADTER   2,585,551
MEANS FOR DETECTING IONIZING RADIATIONS
Filed May 1, 1948   2 SHEETS—SHEET 2

INVENTOR.
ROBERT HOFSTADTER
BY Henry L. Shenier
ATTORNEY

Patented Feb. 12, 1952

2,585,551

UNITED STATES PATENT OFFICE 2,585,551

MEANS FOR DETECTING IONIZING RADIATIONS

Robert Hofstadter, Princeton, N. J.

Application May 1, 1948, Serial No. 24,453

7 Claims. (Cl. 250—83)

My invention relates to an improved means for detecting ionizing radiations in a simple, convenient and expeditious manner.

It has been suggested that scientists and others working in proximity to dangerous emanations, such as beta particles, gamma rays, neutrons, X-rays and the like, which are apt to exist in the vicinity of high potential X-ray apparatus, cyclotrons, synchrotrons and betatrons, atomic energy piles, nuclear fission laboratories and the like wear badges containing photographic plates or film. These plates are periodically developed to determine whether the wearer has been exposed to dangerous emanations. The darkening of the plate and its degree is an indication of exposure. The difficulty with this type of badge is that a rather large quantity of ionizing radiations is necessary to cause a measurable change in the photographic plate. By this time, the wearer of the badge has already been exposed and the badge serves only to act as a warning so that others may be protected.

It is frequently desirable for other reasons to determine the intensity of ionizing radiations in a particular area for use in medical therapy and radiography and for industrial applications. My means for detecting ionizing radiations provides a simple and accurate integrating indicator of ionizing radiations.

One object of my invention is to provide an improved means for detecting ionizing radiations employing a photographic plate or film in which a measurable change is produced in the plate below the level at which the wearer of the badge is subjected to a dangerous quantity of ionizing radiations.

Another object of my invention is to provide an integrating indicator of ionizing radiations, simple in construction and high in efficiency.

Another object of my invention is to provide a means for detecting ionizing radiations of greatly improved efficiency.

Another object of my invention is to provide an improved means for detecting ionizing radiations which is simple to construct and inexpensive to manufacture.

Other and further objects of my invention will appear from the following description.

In the accompanying drawings which form part of the instant specification and which are to be read in conjunction therewith and in which like reference numerals are used to indicate like parts in the various views.

Figure 1:
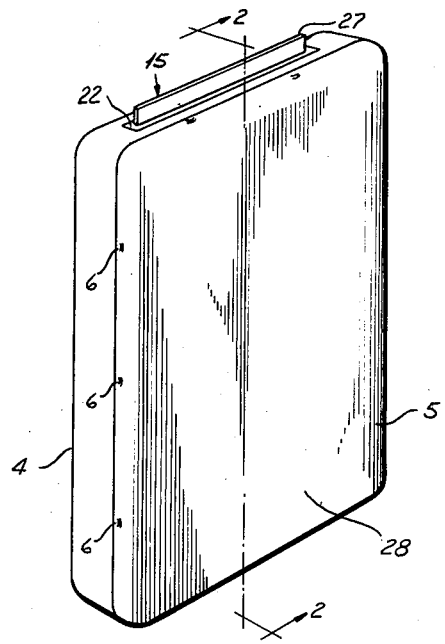
Figure 1 is a perspective view of a badge containing one embodiment of my invention.

In general, my invention contemplates the provision of a photographic plate or film associated with a crystal adapted to luminesce when exposed to ionizing radiations and which is transparent to its own luminescent light. The photographic emulsion and the crystal are such that they complement each other; that is, the emulsion is particularly sensitive to the area of the spectrum of the luminescent light of the crystal.

A great many crystals are adapted to luminesce under the influence of ionizing radiations. Examples of these are naphthalene, anthracene, calcium sulphide, uranine, diamond, willemite and diphenyl. I have however found that crystals of alkali metal halides, when incorporated with a minor amount of an impurity, are especially suitable for use in my invention. Lithium fluoride, for example, has the ability to luminesce under the influence of ionzing radiations. Sodium chloride, potassium bromide and potassium iodide all luminesce with various degrees of intensity. Zinc sulphide with a silver impurity is an excellent phosphor. It now appears that the intensity of luminescence is due to impurities which become accidentally incorporated with the alkali halide crystals in their manufacture. I have found that the addition of very minor amounts of thallium compounds to the alkali halide crystals increases tremendously their power to luminesce under the influence of ionizing radiations. The thallium compounds may be thallium iodide, thallium chloride, thallium nitrate or the like. The quantity of thallium compound by weight is in the order of from five-thousandths molar per centum to five-tenths molar per centum. Generally I have found that about one-hundredths of one per centum by weight is a desirable amount of the thallium impurity to add artificially in order to increase tremendously the luminescent efficiency of the alkali halide crystals.

The alkali halides are among the most transparent solids known. When modified by the addition of the thallium impurity, they become tremendously luminescent and still retain high transparency to and under luminescent light. The density of the alkali halide crystals varies between about 2.0 and 4.5. This high density enables the crystal to stop a large percentage of ionizing particles or gamma rays. Naphthalene or anthracene, which are well known phosphors for gamma and beta activities, have densities in the vicinity of one. The improvement in the ratio of efficiency of my crystals however is much greater than the simple density ratio since the alkali halides comprise elements having higher atomic numbers than the constituents of naphthalene or anthracene. For example, in the case of sodium iodide, sodium and iodine have atomic numbers of eleven and fifty-three respectively. Naphthalene, containing carbon and hydrogen, comprises elements having atomic numbers of six and one respectively. The higher atomic number is of greater significance for gamma ray detection, since elements having high atomic numbers capture gamma rays with greater efficiency than those having low atomic numbers. Then too the alkali halides form beautiful cubic crystals having ideal splitting or cleavage properties.

This enables me to manufacture crystal plates with great ease. This is important in connection with the silvering operation on the sides and back, as will be hereinafter more fully pointed out. In the case of anthracene, large crystals are difficult to obtain. Naphthalene likewise is difficult to crystallize and is, furthermore, brittle. In the case of alkali halides, perfect rectangular parallelepipeds are easy to obtain and are simple to cover with a coating of aluminum or silver.

While I prefer to have an alkali halide crystal sensitized by the addition of a minor amount of thallium compound, it is to be understood that any crystal adapted to luminesce under the influence of ionizing radiations and transparent to its own luminescent light may be employed. In general, I prefer to use crystals of greater density, as these stop more gamma rays as pointed out above. Calcium fluoride, for example, has a greater density than naphthalene. Naphthalene however has greater luminescent powers unless an impurity is present in the calcium fluoride. Calcium, it should be noted, is an alkaline earth metal and not an alkali metal. The alkaline earth metal halides exhibit the same qualities as the alkali metal halides but not to as great an extent. The alkali halides with the thallium compound addition agents are among the most efficient luminescent crystals generally called "phosphors." I can too especially sensitize crystals for neutrons, if I desire, by surrounding the crystal with paraffin and a layer of cadmium. Generally it is better to place the crystal around a nucleus of paraffin and cadmium. It is well known that, when the neutrons hit the protons in the hydrogen in the paraffin, they will be slowed down in the process. Cadmium has a large appetite for slow neutrons and will capture them readily. The resulting nucleus therefore will emit strong gamma rays which are then detected by the crystal, as will be more fully pointed out hereinafter.

The photographic emulsion of the photographic plate or film should be sensitive to the color of the fluorescent light. Willemite fluoresces, for example, with a green light. Calcium sulphide fluoresces with an orange light. Lithium fluoride and naphthalene vary from bluish to ultra-violet. The alkali halide crystals with thallium impurities luminesce in the ultra-violet and blue-violet register of the spectrum with quantities of thallium in the order of one-hundredth molar per centum. With larger quantities of impurities, they luminesce in the green and yellow area. A film made by Ilford designated Q-1 and Q-2 is quite sensitive to bluish light and is therefore especially adapted to be used with anthracene and alkali halide crystals. A film made by the Eastman Kodak Company designated as 103-0 is sensitive to bluish and violet light. The Ilford film contains very little gelatin and hence very little hydrogen and is accordingly very little sensitive to neutrons in and of itself. Gamma rays in the presence of neutrons may be distinguished from neutrons alone by a combination of an Ilford film and a crystal relatively insensitive to neutrons. This combination can, if desired, be used for detecting gamma rays without registering neutrons when they are present simultaneously. Generally the Eastman film is more sensitive than the Ilford and is the one I prefer with my alkali halide crystals.

Figure 3:
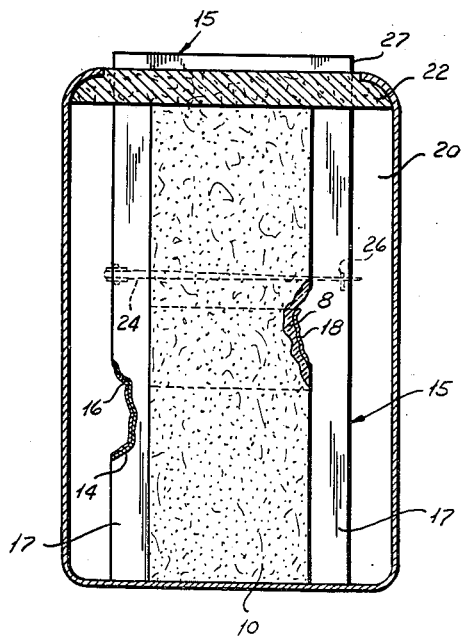
Figure 3 is a sectional view, with parts broken away, taken along the line 3—3 of Figure 2.
Figure 2:
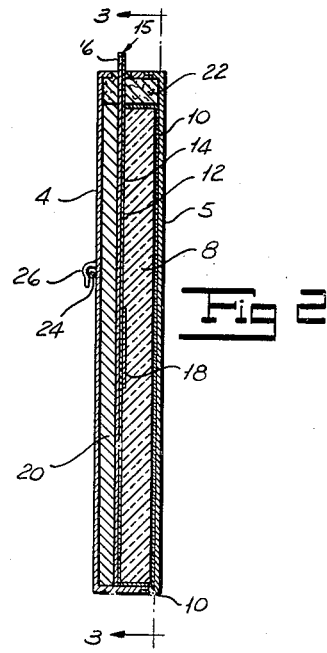
Figure 2 is a sectional view taken along the plane 2—2 of Figure 1.

More particularly, referring now to the drawings, a badge is formed by a casing having a body 4 and a cover 5 which may be secured to each other in any suitable fashion as by upsetting the side of the cover 5 to the body portion at a plurality of points 6 around the periphery of the cover. A crystal 8 such as an alkali halide containing a thallium impurity or naphthalene or the like, adapted to luminesce under the influence of ionizing radiations, is positioned within the casing. The crystal 8 is provided with a coating 10 along the top of the crystal adjacent the cover 5 and around the perimeter of the lateral sides of the crystal. The face of the crystal 12 adjacent the photo-sensitive layer 14 deposited upon the plate or film 16 is clear or roughened except for a lateral strip 18 which extends transversely of the crystal. The coating 10 and the reflective strip 18 may be made of silver, aluminum, platinum, gold or the like. If desired, the face of the crystal adjacent the emulsion may be roughened with a file. This allows light to escape more readily as a smooth surface reflects a fraction of the light. The object of the coating of the top and sides of the crystal is to insure that the luminescent light generated in the crystal will be directed as much as possible to the photo-sensitive emulsion layer 14. By reference to Figure 3, it will be seen that the photographic plate, indicated generally by the reference numeral 15, is wider than the crystal 8 so that there are marginal strips 17 on each side of the crystal. The reflecting band 18 is to provide a control area so that, when the badge is exposed to ionizing radiations and the plate developed, there will be three general areas to examine. The area under the crystal will have been subjected to fluorescent or luminescent light generated in the crystal by the ionizing radiations. The strips 17 will have been subjected to the direct action of the ionizing radiations. The area underneath the strip 18 will be subjected only to those gamma rays or beta particles or the like which filter through the crystal so that the area under the strip 18 will be substantially untouched by radiation, unless the radiation is of a penetrating variety. In this case, the radiation will be weakened, but not totally removed, by the passage through the crystal and this transmission imparts information concerning the type of radiation to which the device has been exposed. The developed plate therefore will have a blackening along the strips 17 produced directly by the ionizing radiations upon the photographic plate. The area under the crystal, except for the strip, will have a blackening produced by the fluorescent light and the area under the strip will be the photographic plate substantially untouched by either type of activity unless the radiation is of the penetrating variety. The blackening produced by fluorescent light, therefore, can readily be compared with the appearance of the photographic plate and also with the two lateral strips which are not under the crystal. The difference between the clear portion under the strip 18 and the blackening under the crystal and the lessened blackening along the margins can be used for standardizing, and the amount of ionizing radiations to which the badge has been subjected can be readily determined within fairly close limits.

A strip of cardboard or the like 20 is positioned within the housing, spaced from the crystal 8, in order to provide support for the photographic plate 15 and hold it in close contact with the face 12 of the crystal 8. The crystal 8 and the spacer 20 are retained in position within the housing by a strip of felt 22 which is provided with a slot through which photographic plate 15 may be inserted. The felt 22 acts as a light trap to prevent light from affecting the plate inside the housing. If desired, the crystal 8 and the spacer 20 may be secured to the housing by any suitable adhesive such as rubber cement or the like. Secured to the back of the housing, I provide a pin 24, the end of which is adapted to be inserted under a latch 26 so that the badge may be worn by a person. The face 28 of the badge may be provided with any suitable indicia such as the photograph of the wearer, a number, or any other identifying means, if the badge is to be used as a pass to restricted areas.

Figure 4:
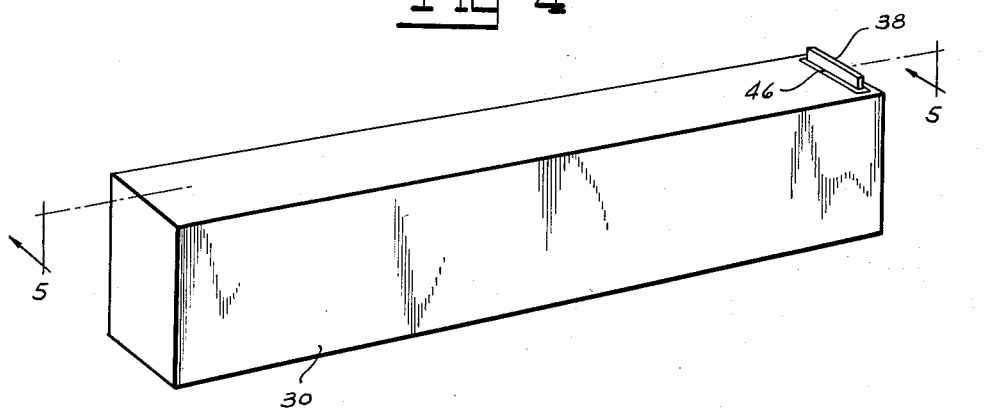
Figure 4 is a perspective view of a device for detecting ionizing radiations showing another embodiment of my invention.
Figure 5:
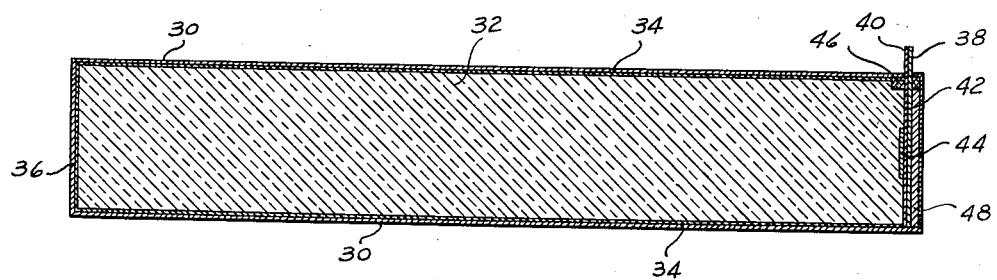
Figure 5 is a sectional view taken along line 5—5 of Figure 4.

Referring now to Figures 4 and 5, I have shown an important modification in my invention in which I employ an elongated crystal and position the photographic strip at the end of the crystal. With really transparent crystals, this gives a great enhancement of the intensity because all of the light is thus brought to a small area so that the light per unit of area becomes very great. The alkali halides, in combination with a small amount of thallium compound, are quite advantageous in this embodiment. The container 30 housing a crystal 32 may be of any suitable material. The four sides of the crystal 32 are provided with a reflecting coating 34. The end of the crystal is provided with a reflecting coating 36. The photographic plate or film 38 is provided with a photosensitive emulsion 40 which faces the end of the crystal 42. A light-reflecting or absorbing strip 44 is placed across the end of the crystal to provide a control surface. The light trap 46 of felt or the like is provided as in the modification described heretofore. A filler member 48 is provided to hold the photographic plate or film against the end of the crystal.

Figure 6:
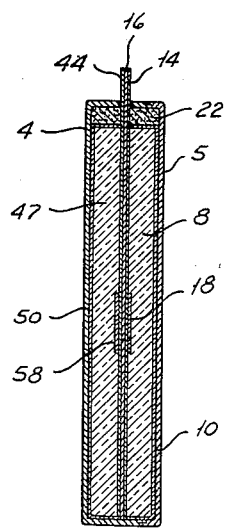
Figure 6 is a sectional view similar to Figure 2 showing still another embodiment of my invention in which a pair of crystals are employed.

In the form of the invention shown in Figure 6, the photographic plate or film 16 is provided with a photosensitive layer 14 and a second photosensitive layer 43. In addition to the first crystal, I provide a second crystal 47 which is provided with a light-reflecting coating 50 across the back and sides of the crystal. The face of the crystal is provided with a light-reflecting or light-absorbing strip 58 similar to the strip 18 of crystal 8. The light trap 22 protects the sensitized medium. The effect as a detector is therefore double since both crystals are operative.

In use, the device is loaded with a photographic plate or film in a dark room and worn by the person working in or about sources of ionizing radiations. At frequent intervals, which may be every three hours or less if desired, the plates are removed and developed and examined for changes. A darkening under the crystal area indicates that the badge has been exposed to ionizing radiations and the difference in the amount of darkening in the control area under the strip 18 in the darkened portion serves as an indication of the amount of darkening. Scales for comparison may be readily supplied calibrated as a function of the intensity of the ionizing radiations. In this manner, the device acts as a safety means by warning of the presence of amounts of ionizing radiations before the exposure is continued sufficiently long to cause injury and thus enables corrective measures to be taken to protect personnel. The end 27 of the photographic plate which extends outside the housing may be marked with a number corresponding to the number of the badge or otherwise suitably identified.

My device increases the sensitivity of the detection of ionizing radiations by a factor of between 10 and 1,000 over that afforded by the best film or plate used unaided by my invention.

Some of the alkali halides are hygroscopic or deliquescent with the result that the surfaces will deteriorate in use. The reflecting coating will protect the sides and back of the crystal. The clear surfaces however may alter in use. I have found that the surface of the crystal can be protected by a coating of a liquid polystyrene composition, nitrocellulose lacquer or the like, which materials are transparent to the fluorescent light. Sodium iodide is particularly useful but, to prolong its effective life, a coating is of value.

It will be seen that I have accomplished the objects of my invention. I have provided a means for detecting ionizing radiations of improved efficiency. My detection device is simple to construct and inexpensive to manufacture. It may be readily calibrated to serve as an accurate guide to the amount of ionizing radiations present and is sufficiently sensitive to give adequate warning before serious injury to personnel occurs.

It will be understood that certain features and subcombinations are of utility and may be employed without reference to other features and subcombinations. This is contemplated by and is within the scope of my claims. It is further observed that various changes may be made in details within the scope of my claims without departing from the spirit of my invention. It is therefore to be understood that my invention is not to be limited to the specific details shown and described.

Having thus described my invention, I claim:

1. A transparent crystalline phosphor comprising sodium iodide and from five-thousandths of one molar per centum to one molar percentum of a thallium compound, said crystalline phosphor being of sufficient mass to stop a large percentage of ionizing radiations.

2. Apparatus for detecting ionizing radiations including in combination a housing, a photosensitive means positioned in said housing, a transparent crystalline phosphor of sufficient mass to stop a large percentage of ionizing radiations positioned in said housing adjacent said photosensitive means, said crystalline phosphor adapted to luminesce under the influence of ionizing radiations and comprising sodium iodide and from five-thousandths to one molar per centum of a thallium compound.

3. Apparatus for detecting ionizing radiations including in combination a housing, a photographic plate positioned in said housing, said plate having an emulsion sensitive to light of a predetermined area of the spectrum, a transparent crystal of sufficient mass to stop a large percentage of ionizing radiations adjacent said photosensitive emulsion, said crystal adapted to luminesce under the influence of ionizing radiations with a light corresponding to said predetermined area of the spectrum, said crystal having a dimension less than the corresponding dimension of said photographic plate, the top and sides of the crystal being formed with light-reflecting surfaces and light-reflecting means positioned between a portion of the crystal and the photosensitive emulsion for shielding luminescent light away from the photosensitive surface.

4. A device for detecting ionizing radiations including in combination a container, a transparent crystalline phosphor of sufficient mass to stop a large percentage of ionizing radiations adapted to luminesce under the influence of ionizing radiations, said phosphor being disposed within said container and having a length in excess of its height or width and photosensitive means positioned in said housing adjacent one end of said phosphor.

5. A device as in claim 4 in which said photosensitive means comprises a photographic plate having a width greater than the width of the crystalline phosphor.

6. A device as in claim 4 in which said crystalline phosphor comprises an alkali halide and a minor amount of a thallium compound.

7. A device as in claim 4 in which the surfaces of said crystalline phosphor are covered with a light-reflecting material except along the surface adjacent the photosensitive medium.

ROBERT HOFSTADTER.

REFERENCES CITED

The following references are of record in the file of this patent:

UNITED STATES PATENTS

| Number | Name | Date |
| --- | --- | --- |
| 1,531,620 | Meyer | Mar. 31, 1925 |
| 1,635,952 | Pomeranz | July 12, 1927 |
| 2,108,503 | Murray | Feb. 15, 1938 |
| 2,258,593 | Black | Oct. 14, 1941 |
| 2,272,375 | Kallmann et al. | Feb. 10, 1942 |
| 2,297,478 | Kallmann | Sept. 29, 1942 |
| 2,330,171 | Rosenthal | Sept. 21, 1943 |
| 2,387,887 | Dimsdale et al. | Oct. 30, 1945 |
| 2,436,182 | Schmidling | Feb. 17, 1948 |
| 2,448,963 | Dicke | Sept. 7, 1948 |
| 2,483,991 | Wollan et al. | Oct. 4, 1949 |

FOREIGN PATENTS

| Number | Country | Date |
| --- | --- | --- |
| 222,027 | Germany | May 17, 1910 |
| 492,722 | Great Britain | Sept. 26, 1938 |

OTHER REFERENCES

"Fluorochemistry"—De Ment Publ. by Chemical Publ. Co. Inc., Brooklyn, N. Y., 1945, pp. 346–351, 407–410.

The Detection of Gamma-Rays with Thallium-Activated Sodium Iodide Crystals—Robt. Hofstadter, Physical Review, vol. 75, #5, Mar. 1, 1949, pp. 796–797.